(12) United States Patent
Szarvasy et al.

(10) Patent No.: US 9,845,704 B2
(45) Date of Patent: Dec. 19, 2017

(54) COOLED FLANGE CONNECTION OF A GAS-TURBINE ENGINE

(71) Applicant: Rolls-Royce Deutschland Ltd & Co KG, Blankenfelde-Mahlow (DE)

(72) Inventors: Ivo Szarvasy, Berlin (DE); Friedrich Lohmann, Berlin (DE)

(73) Assignee: ROLLS-ROYCE DEUTSCHLAND LTD & CO KG, Blakenfelde-Mahlow (DE)

( * ) Notice: Subject to any disclaimer, the term of this patent is extended or adjusted under 35 U.S.C. 154(b) by 303 days.

(21) Appl. No.: 14/570,636

(22) Filed: Dec. 15, 2014

(65) Prior Publication Data

US 2015/0176430 A1    Jun. 25, 2015

(30) Foreign Application Priority Data

Dec. 18, 2013    (DE) .................. 10 2013 226 490

(51) Int. Cl.
*F01D 25/12* (2006.01)
*F02C 7/18* (2006.01)
(Continued)

(52) U.S. Cl.
CPC ............ *F01D 25/12* (2013.01); *F01D 25/14* (2013.01); *F01D 25/243* (2013.01); *F02C 7/18* (2013.01);
(Continued)

(58) Field of Classification Search
CPC ........ F01D 25/12; F01D 25/14; F01D 25/243; F01D 5/081; F01D 5/082; F23R 3/002;
(Continued)

(56) References Cited

U.S. PATENT DOCUMENTS 4,309,145 A    1/1982    Viola
4,749,029 A *  6/1988    Becker .................... F23R 3/002
                                                         165/169
(Continued)

FOREIGN PATENT DOCUMENTS

DE       60129403       4/2008
DE     102008048006     3/2010
EP        0559420       9/1993

OTHER PUBLICATIONS

European Search Report dated Apr. 22, 2015 for related European Patent Application No. 14197292.7.
(Continued)

*Primary Examiner* — Pascal M Bui Pho
*Assistant Examiner* — Marc Amar
(74) *Attorney, Agent, or Firm* — Shuttleworth & Ingersoll, PLC; Timothy J. Klima (57) ABSTRACT

A cooled flange connection of a gas-turbine engine is annular and includes a first flange of a first component, at least a second and central flange of a second component, and a third flange of a third component. At the contact area between the first and the second flange a first circumferential duct is provided that extends over at least part of the circumference. At the contact area between the second and the third flange a second circumferential duct is provided that extends over at least part of the circumference. The first and second circumferential ducts are connected to one another by axial connecting recesses. The first flange is provided with at least one inflow recess connected to the first circumferential duct. The third flange is provided with at least one outflow recess connected to the circumferential duct.

9 Claims, 7 Drawing Sheets

(51) Int. Cl.
*F01D 25/14* (2006.01)
*F01D 25/24* (2006.01)

(52) U.S. Cl.
CPC .... *F05D 2260/202* (2013.01); *F05D 2260/31* (2013.01); *F23R 2900/03043* (2013.01)

(58) Field of Classification Search
CPC .. F23R 2900/00005; F23R 2900/00012; F23R 2900/03043; F02C 7/12; F02C 7/20; F02C 7/18
See application file for complete search history.

(56) References Cited

U.S. PATENT DOCUMENTS

| | | | |
|---|---|---|---|
| 4,749,298 A * | 6/1988 | Bundt | F02K 1/82 165/134.1 |
| 5,072,785 A | 12/1991 | Dressler et al. | |
| 5,205,115 A * | 4/1993 | Plemmons | F01D 11/24 415/115 |
| 5,219,268 A * | 6/1993 | Johnson | F01D 11/24 415/115 |
| 5,593,277 A | 1/1997 | Proctor et al. | |
| 6,428,272 B1 | 8/2002 | Pepi et al. | |
| 7,146,815 B2 * | 12/2006 | Burd | F23R 3/002 60/752 |
| 8,459,941 B2 | 6/2013 | Jasko et al. | |
| 8,800,292 B2 * | 8/2014 | Bottcher | F23M 5/04 60/752 |
| 2005/0204746 A1 | 9/2005 | Chereau et al. | |
| 2015/0082798 A1 * | 3/2015 | Hucker | F01D 25/145 60/753 |

OTHER PUBLICATIONS

German Search Report dated Mar. 25, 2013 for counterpart German Patent Application No. 10 2013 226 490.9.

Office Action issued by the European Patent Office dated Aug. 14, 2017 for counterpart European Application No. 14 197 292.7.

* cited by examiner

COOLED FLANGE CONNECTION OF A GAS-TURBINE ENGINE

This application claims priority to German Patent Application DE102013226490.9 filed Dec. 18, 2013, the entirety of which is incorporated by reference herein.

This invention relates to a cooled flange connection of a gas-turbine engine.

In particular, the invention thus relates to a flange connection designed as an annular flange. The flange connection includes a first flange of a first component, a second and central flange of a second component and a third flange of a third component. The individual flanges are braced against one another by a plurality of bolts spread over the circumference and passing through the flanges.

It is known from the state of the art that flange connections, in particular those of gas-turbine engines, are cooled.

U.S. Pat. No. 7,185,499 B2 describes a compressor flange which, for screw ventilation purposes, taps air from the downstream combustion chamber plenum via radial holes, distributes it via circumferential grooves and finally introduces it into the compressor plenum via radial holes. The disadvantage of this solution is related to production: the segmentation of the flange and the drilling of the radial holes or slots are time-consuming and costly. Furthermore, the screws are only flushed in a very narrow area, since the holes exiting from the circumferential groove are blind holes, thus creating a dead cavity, and are not flushed.

The disadvantage of these flange designs is their thermal inertia. Due to the high thermal capacity of the entire flange assembly, a long period is needed until the entire flange has heated up all the way through or cooled down.

In transient states, i.e. during acceleration or deceleration of an engine, the flange assumes the altered temperature from the outside to the inside, so that the bolts located inside do not assume the altered temperature until much later. The result during transient states is temperature differences of around 100 K. Taking into account the expansion coefficients, additional stresses are therefore introduced into the bolts which have the same level as the pretension and hence greatly reduce the service life of the bolts.

Furthermore, the (thin-walled) flange connections very rapidly assume the altered temperature, so that high bending stresses occur at the transitional zones between flange and flange connections.

The object underlying the present invention is to provide a flange connection of the type specified at the beginning, which while being simply designed and easily and cost-effectively producible, avoids the disadvantages of the state of the art, and enables efficient cooling, in particular of the bolts.

It is a particular object to provide a solution to the above problems by a combination of features described herein. Further advantageous embodiments will become apparent from the present description.

It is thus provided in accordance with the invention that at two contact areas between each two of the flanges a circumferential duct is provided that extends around at least part of the circumference. The flange upstream in the flow direction has a connecting recess which is connected to the first circumferential duct located upstream, in order to introduce cooling air into the latter. Accordingly, the flange arranged downstream in the flow direction has at least one outflow recess for removing cooling air from the second flange.

To permit a flow of cooling air through the two circumferential ducts, at least one axial connecting recess is provided which connects the first circumferential duct to the second circumferential duct.

The cooling air can thus enter through the inflow recess, flow into the first circumferential duct, pass from the latter through the connecting recesses into the second circumferential duct, and exit through the outflow recess. Hence cooling air flows through the entire flange. An even through-flow is assured by a suitable positioning of the individual recesses over the circumference.

In the flange connection in accordance with the invention, the pressure is higher in the area of the inflow recess than in the area of the outflow recess. The result of this is a pressure drop or pressure gradient permitting the through-flow.

The inflow recess and the outflow recess are preferably arranged offset relative to one another in the circumferential direction, so that a direct through-flow in the axial direction is substantially avoided. The same applies for the connecting recesses.

To improve the cooling of the bolts, it is also favourable when the connecting recesses are combined with the bolt holes. To that end, the bolt holes preferably have a diameter greater than the external diameter of the bolts. As a result, an air duct is formed around the bolts through which cooling air can flow in order to cool said bolts. It is preferably the bolt heads and or the nuts which seal off the bolt holes from the environment.

To improve the through-flow and hence the cooling, it is particularly favourable when the inflow recess and the outflow recess are each arranged axially.

It is furthermore particularly advantageous when the bolts with the bolt holes pass directly through the circumferential ducts. This results in the maximum possible flushing with cooling air.

The invention thus describes the ventilation of the bolts. Air from the upstream cavity is passed through holes in the first flange into a first circumferential duct. This circumferential duct can be integrated both in the first flange on the downstream side and in the second flange on the upstream side, and be both segmented and unsegmented. This air passes through the bolt holes into the downstream circumferential duct, so that the heat transfer to the bolts is increased and the temperature difference and hence expansion difference between flange and bolt is reduced. As a result, the stresses acting in the bolts are reduced. The downstream second circumferential duct can in turn be both segmented and unsegmented, and can be integrated both in the upstream flange on the downstream side and in the downstream flange on the upstream side. The air exits the flange assembly through axial holes that may be offset either coaxially or in the circumferential or radial direction relative to the intake holes. The number of flanges between the upstream and downstream flanges is one or more, and if the bolts are flushed axially at least one central flange is required. If the annular gap is already sufficient, no central flange is needed. In accordance with the invention, a flange connection is also conceivable that uses the bolt heads and bolt nuts as the inflow and outflow recesses (by means of holes in the bolt head or bolt nut or by slots underneath the bolt heads).

The ventilation of the bolts and of the flange achieves an increase in the service life of the bolts and also of the flange connections, since the relative expansions and concomitant stresses are reduced.

The present invention is described in the following in light of the accompanying drawing, showing an exemplary embodiment. In the drawing.

Figure 1:
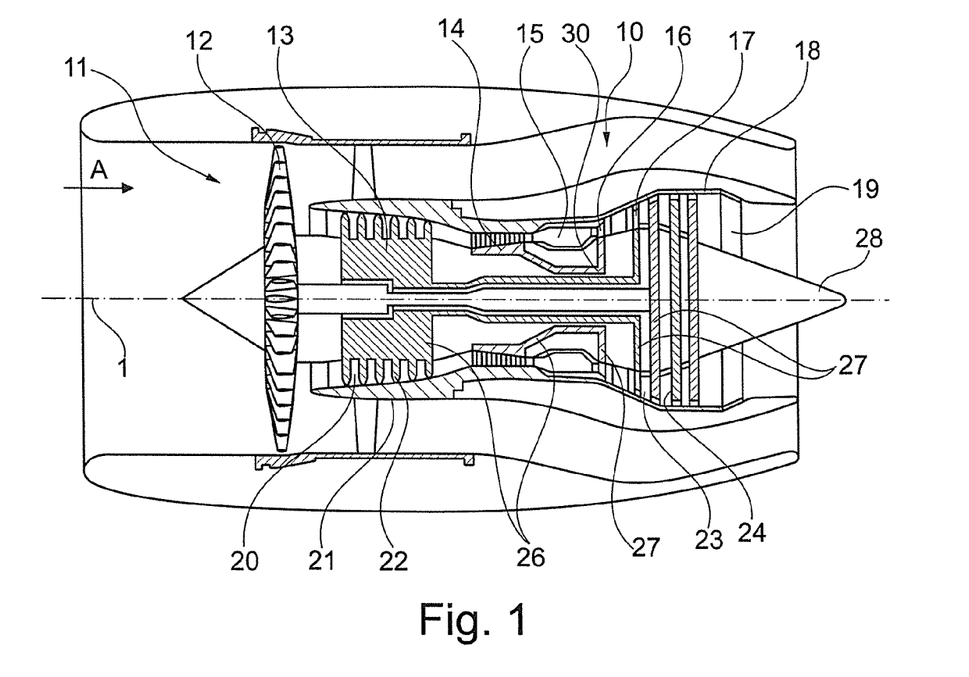
FIG. 1 shows a schematic representation of a gas-turbine engine in accordance with the present invention.

The gas-turbine engine 10 in accordance with FIG. 1 is a generally represented example of a turbomachine, where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Figure 2:
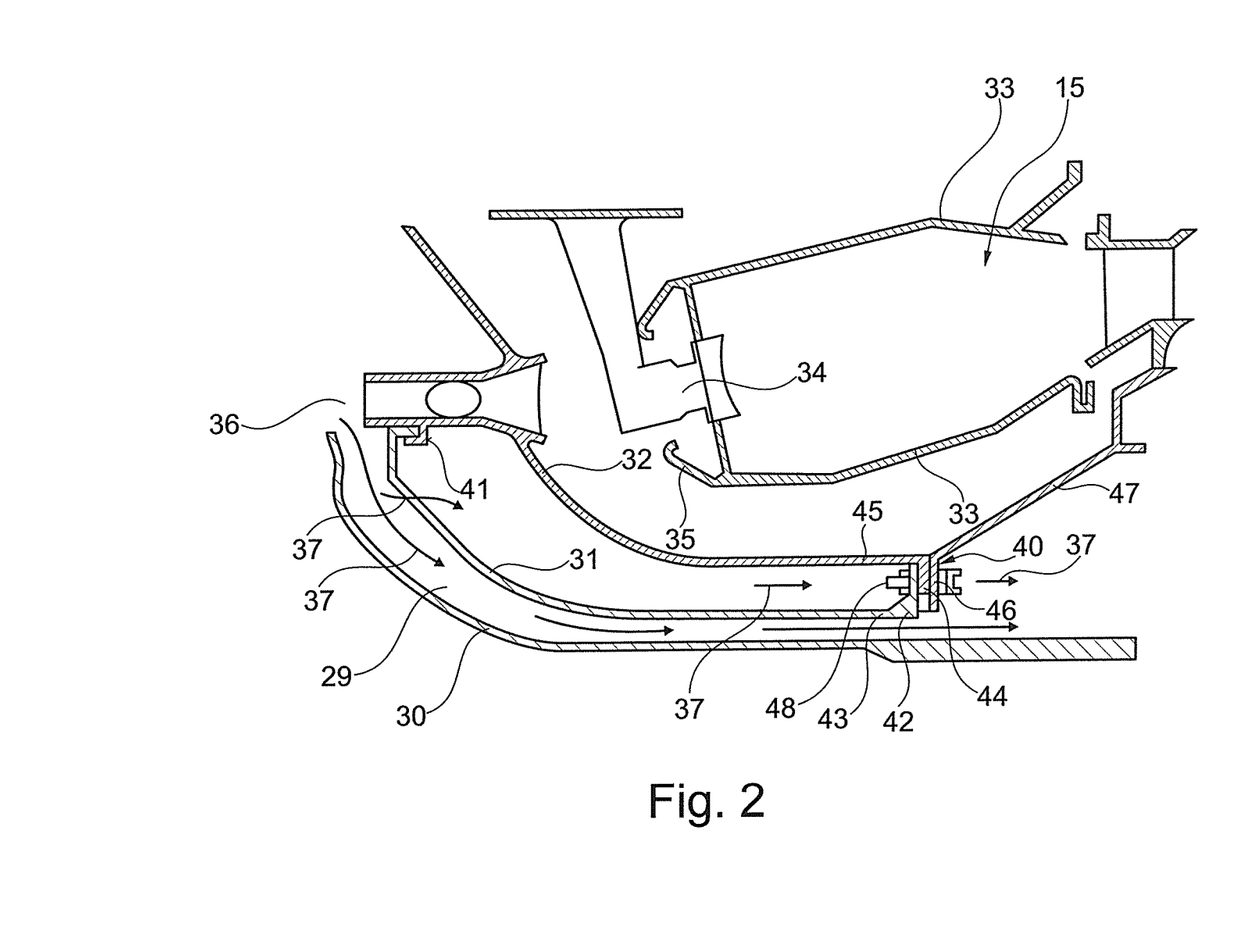
FIG. 2 shows a schematic representation of an exemplary embodiment for using the flange connection in accordance with the present invention.

FIG. 2 shows an enlarged detailed view, where the combustion chamber 15 is shown schematically with an outer and an inner combustion chamber wall 33. The reference numeral 34 shows a burner arranged in the area of a combustion chamber head 35. The combustion chamber 15 is received and mounted inside a combustion chamber casing 32 shown only schematically in FIG. 2.

A high-pressure shaft 30 is arranged inside the combustion chamber casing 32 radially relative to the engine axis 1. This shaft too is shown only schematically in FIG. 2. An intermediate space, referred to as an annular duct 29, is thus formed between the combustion chamber casing 32 and the high-pressure shaft 30.

As can be seen from the illustration in FIG. 2, cooling air 37 flows through a cooling air inlet 36 into the intermediate space between the combustion chamber casing 32 and the high-pressure shaft 30.

A flow-guiding element 31 is provided here which is designed as a rotating body and has a substantially tubular design. The flow-guiding element 31 is designed and arranged such that a cross-section of the annular duct 29 is achieved which is substantially constant from the cooling air inlet 36 onwards.

The flow-guiding element 31 is connected by means of a screw fastening 40 to the combustion chamber casing 32. In the area of the cooling air inlet 36, the flow-guiding element 31 is fastened by means of a mounting 41 which can for example be designed as a positive connection.

As shown in FIG. 2, part of the cooling air 37 passing through recesses 57 (see FIG. 7) and through the flow-guiding element 31 is routed to the flange connection.

Figure 3:
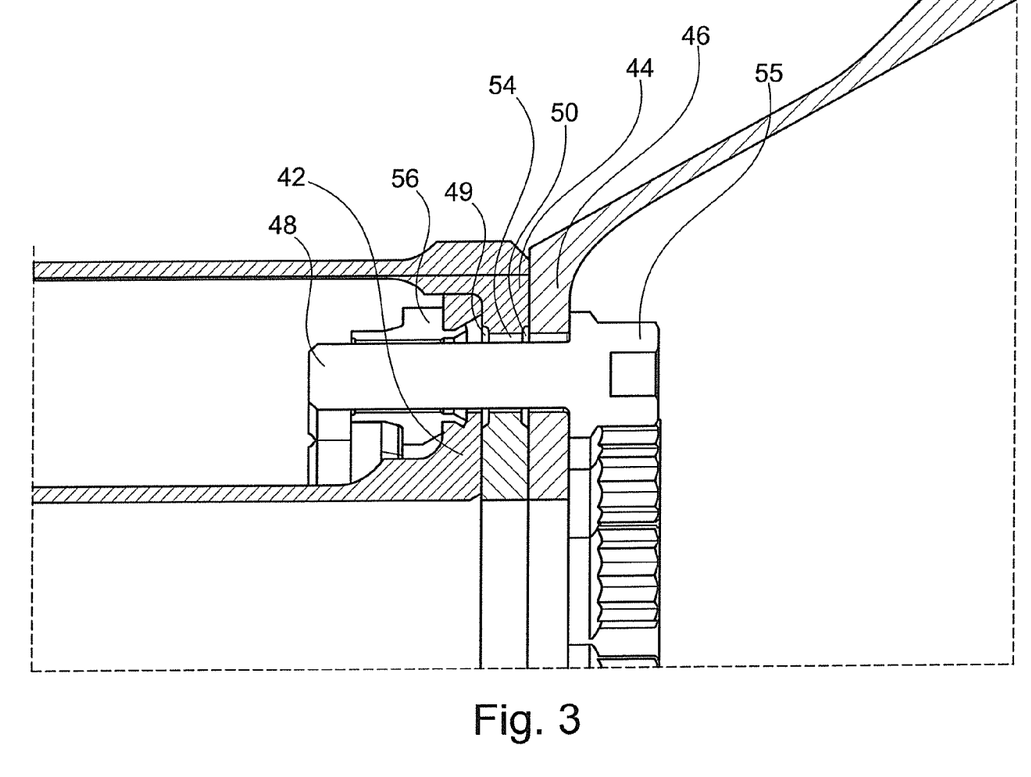
FIG. 3 shows an enlarged detailed view in accordance with FIG. 2 in sectional representation.
Figure 4:
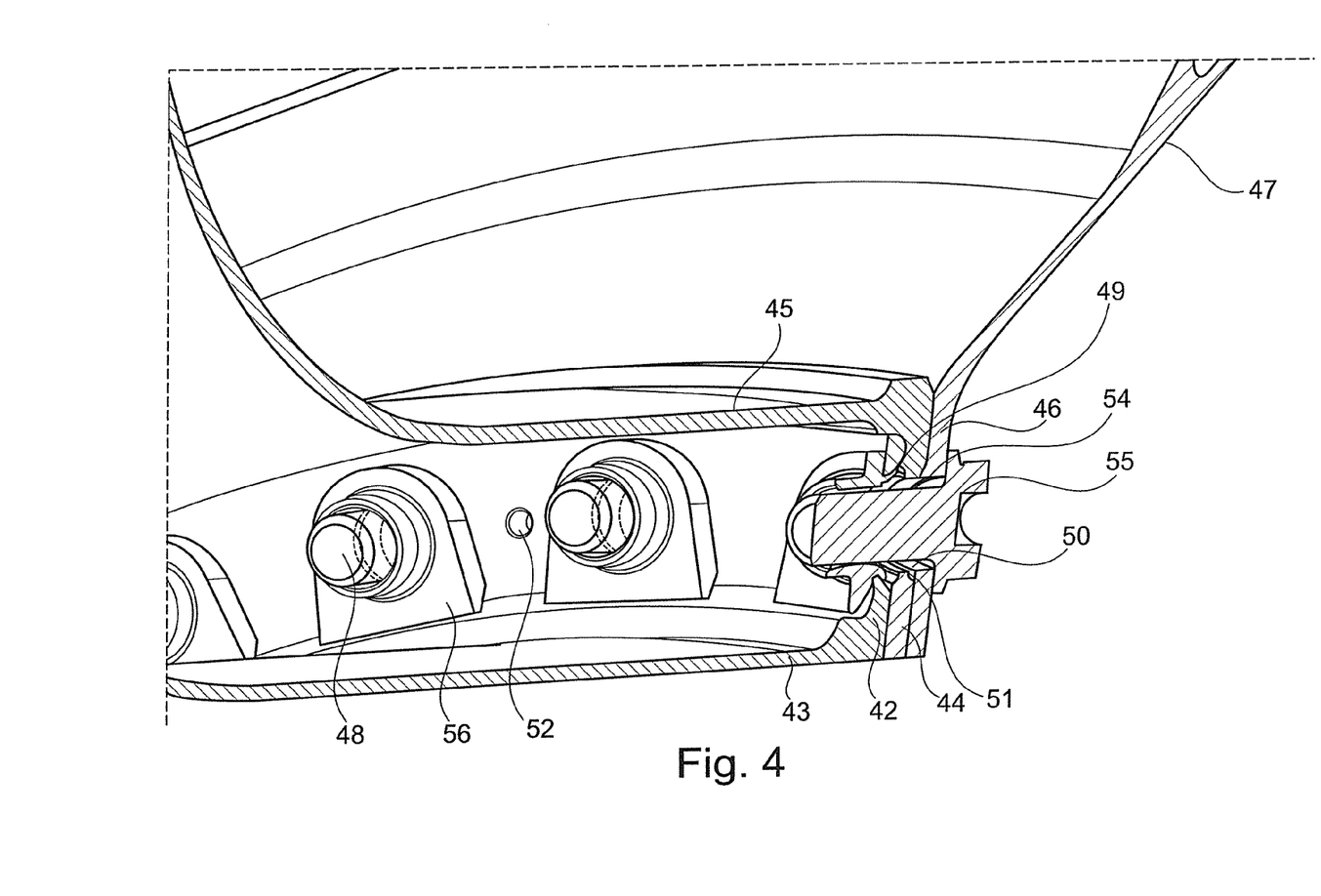
FIGS. 4, 5 show enlarged detailed views, by analogy with FIG. 3, in perspective representation.
Figure 5:
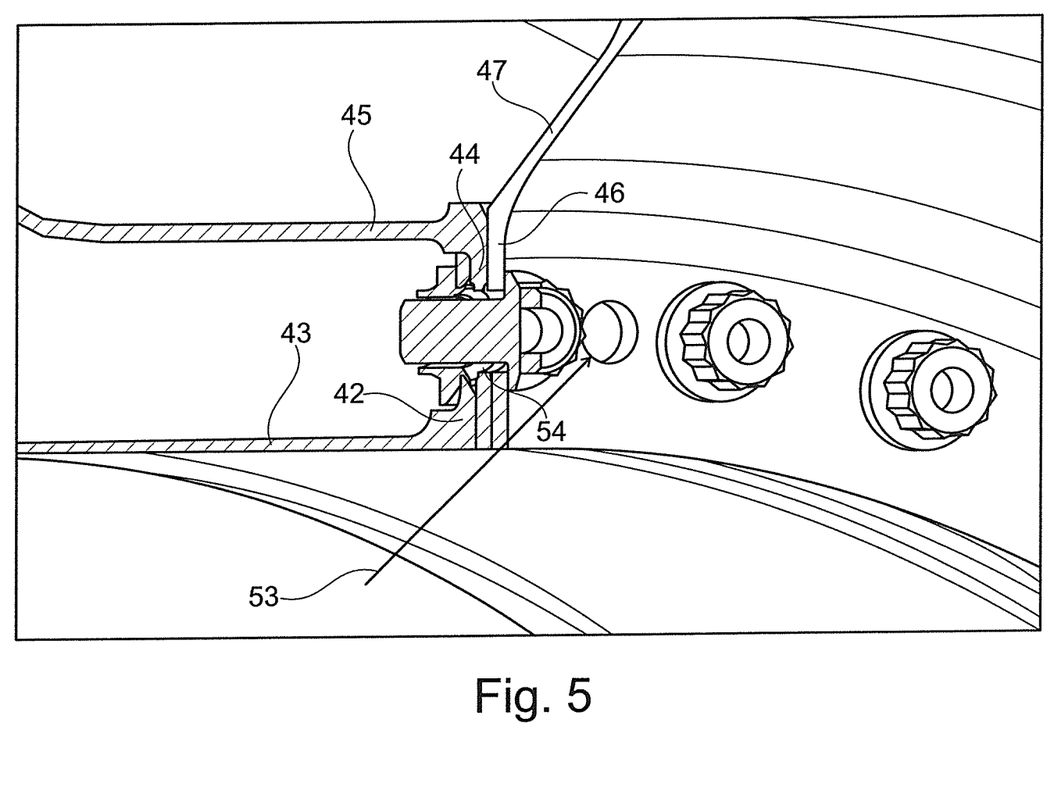

FIGS. 3 to 5 each show the embodiment of the flange connection in accordance with the invention. In particular, the arrangement of the flanges is shown in detail. A first flange 42 of a first component 43 is arranged upstream. It is followed by a second flange 44 which is arranged as a central flange and assigned to a second component 45. A third flange 46 of a third component 47 is arranged downstream. To secure the flanges, they are passed through by a plurality of bolts 48 arranged around the circumference and designed as threaded bolts having both a bolt head 55 and a nut 56. This design conforms to the state of the art.

A first circumferential duct 49 is provided in the contact area between the first flange 42 and the second flange 44 and can either be designed in the first flange 42 or in the second flange 44. It is also possible to provide part of the first circumferential duct in both flanges. A second circumferential duct 50 is provided in the same way between the second flange and the third flange. The two circumferential ducts 49 and 50 can be designed segmented, but can also extend without any interruption around the entire circumference of the respective flange.

At least one axial connecting recess 51 is provided between the circumferential ducts 49 and 50 and is preferably designed in the form of a bolt hole 54. Cooling air can flow from the first circumferential duct 49 into the second circumferential duct 50 through the axial connecting recess 51 or through the bolt hole 54 designed with a larger diameter. The first flange 42 has inflow recesses 52 while the third flange 46 is provided with outflow recesses 53.

Figure 6:
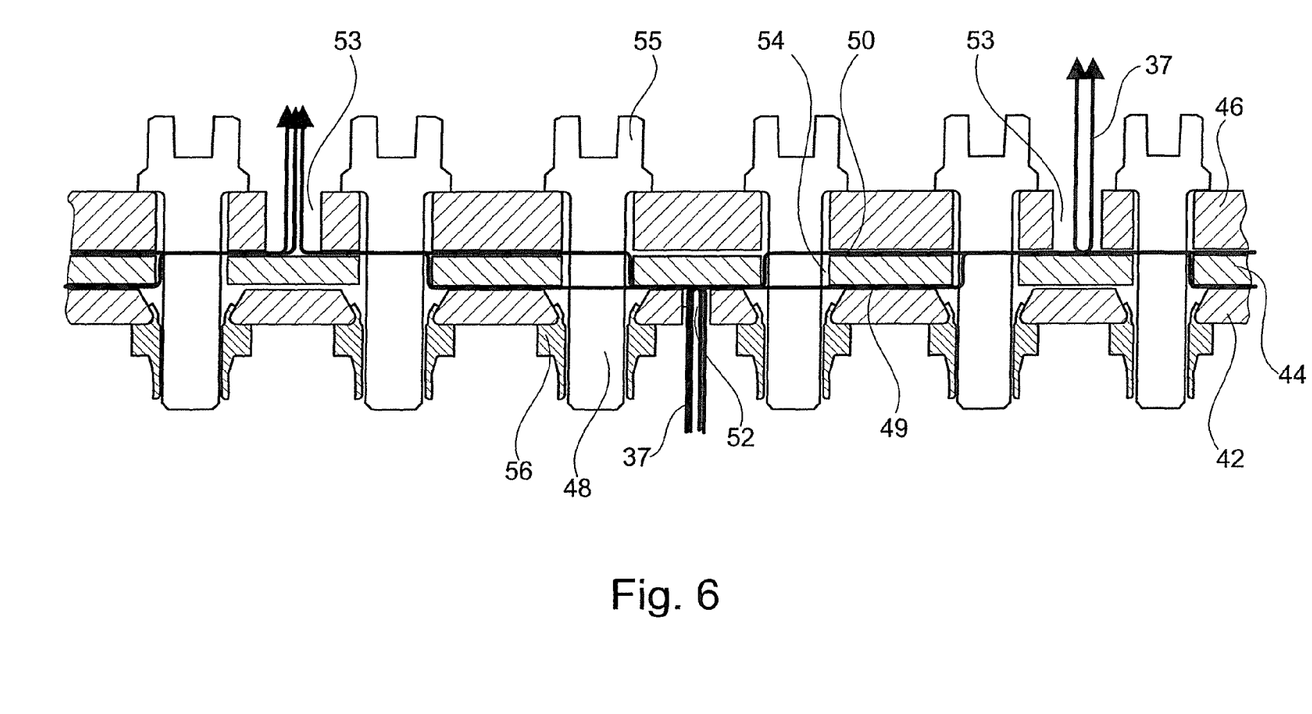
FIG. 6 shows a perspective representation explaining the flow paths.

FIG. 6 shows the flow through the circumferential ducts 49 and 50. It makes clear that the air entering through the inflow recess 52 can spread in any way inside the first circumferential duct 49 in order to pass through any bolt holes 54 into the second circumferential duct 50 and from here exit through the outflow recesses 53. This ensures an even cooling both of the flange and of the bolts. Both the flanges and the bolts can thus be influenced thermally, with only a relatively small cooling air quantity being needed to do so. Cooling is enabled by the pressure gradient which forms.

Figure 7:
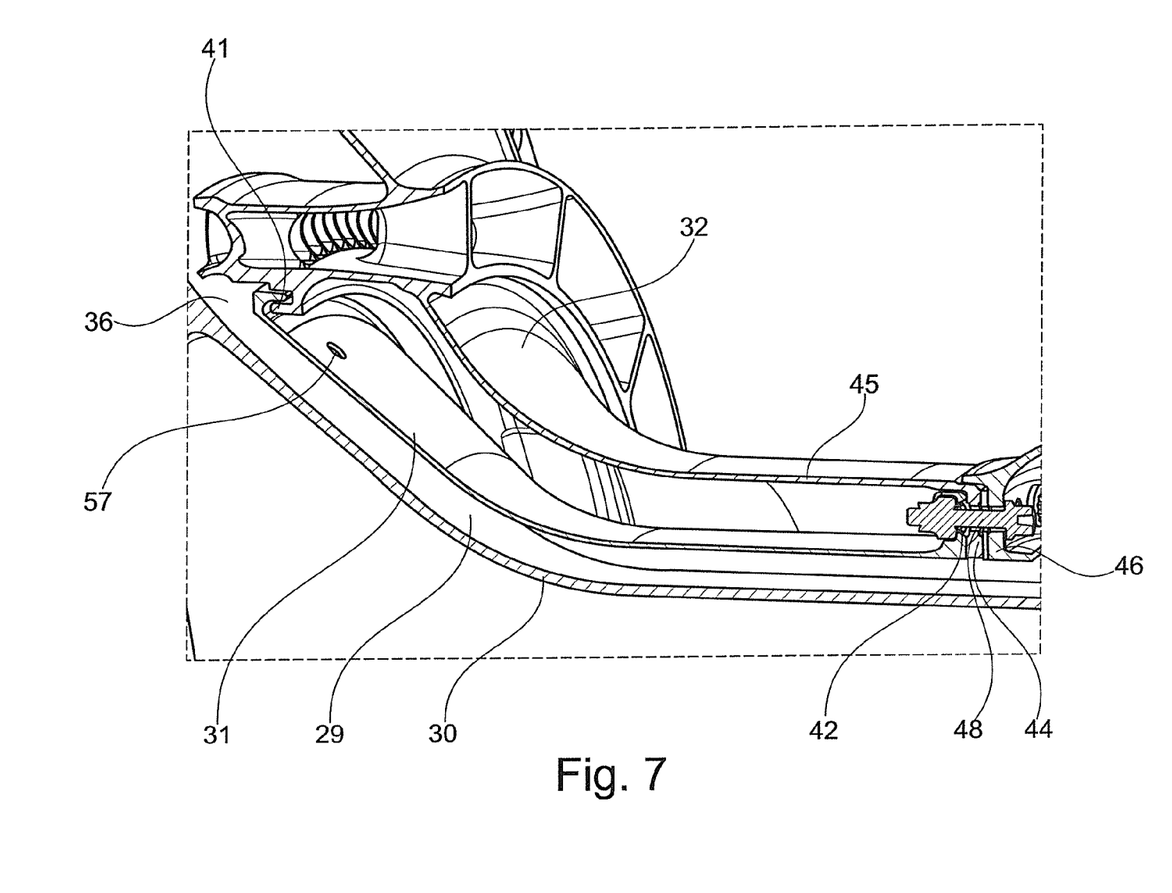
FIG. 7 shows a schematic representation, by analogy with FIG. 2, of a further exemplary embodiment of the present invention.

FIG. 7 shows schematically, by analogy with FIG. 2, a further design variant of the invention. Identical parts are provided with the same reference numerals. The illustration in FIG. 7 shows in particular the positions of the recesses 57 for cooling air to pass through. These recesses are explained in the above in connection with FIG. 2. Hence, part of the cooling air flowing through the annular duct 29 passes via the recesses 57 through the flow-guiding element 31 in order to cool the flange connection. The pressure of the cooling air falls as the radius decreases between the high-pressure shaft 30 (compressor drum) and the flow-guiding element 31. This lower pressure is also applied behind the flange connection. The pressure remains constant between the flow-guiding element 31 and the combustion chamber casing 32, such that a relatively high pressure builds up in the area of the radially outer side of the flow-guiding element 31 due to the radial positions of the recesses 57 and is sufficient to ensure cooling and a flow through the flange connection.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Annular duct
30 High-pressure shaft
31 Flow-guiding element
32 Combustion chamber casing
33 Combustion chamber wall
34 Burner
35 Combustion chamber head
36 Cooling air inlet
37 Cooling air
38 Flow-back and swirl area
39 Recirculation flow
40 Screw fastening
41 Mounting
42 First flange
43 First component
44 Second flange
45 Second component
46 Third flange
47 Third component
48 Bolt
49 First circumferential duct
50 Second circumferential duct
51 Axial connecting recess
52 Inflow recess
53 Outflow recess
54 Bolt hole
55 Bolt head
56 Nut
57 Recess

What is claimed is:
1. A cooled flange connection of a gas-turbine engine, where the flange connection is an annular flange and comprises:
   a first flange of a first component,
   a second flange of a second component, and
   a third flange of a third component,
   a plurality of bolts spread over a circumference of the flange connection and passing through the first flange, the second flange and the third flange to connect together the first flange, the second flange and the third flange, with the second flange being positioned between the first flange and the third flange,
   a first circumferential duct positioned at a contact area between the first flange and the second flange, the first circumferential duct extending over at least part of the circumference,
   a second circumferential duct positioned at a contact area between the second flange and the third flange, the second circumferential duct extending over at least part of the circumference,
   axial connecting recesses connecting the first circumferential duct and the second circumferential duct to one another,
   the first flange including a plurality of inflow recesses passing from an exterior of the first flange axially through the first flange to connect with the first circumferential duct, with each of the plurality of inflow recesses having a respective inflow axis through the first flange, and
   the third flange including a plurality of outflow recesses connected to the second circumferential duct and passing axially through the third flange from the second circumferential duct to an exterior of the third flange, with each of the plurality of outflow recesses having a respective outflow axis through the third flange;
   a plurality of bolt holes in the first flange, the second flange and the third flange in which the plurality of bolts are respectively positioned, the plurality of bolt holes in the second flange having diameters greater than external diameters of the plurality of bolts to form the axial connecting recesses;
   wherein at least some of the plurality of inflow recesses are arranged circumferentially offset relative to all of the plurality of outflow recesses and at least some of the plurality of outflow recesses are arranged circumferentially offset relative to all of the plurality of inflow recesses;
   wherein at least some of the respective inflow axes and some of the respective outflow axes are parallel to a main axial direction of the cooled flange connection; and
   wherein cooling air flows through the flange connection of the gas-turbine engine.

2. The cooled flange connection in accordance with claim 1, wherein a pressure is higher in an area of all of the inflow recesses than in an area of all of the outflow recesses during operation of the gas-turbine engine.

3. The cooled flange connection in accordance with claim 1, wherein the plurality of bolts have a plurality of bolt heads respectively and the plurality of bolt heads seal off the plurality of bolt holes from an environment of the gas-turbine engine.

4. The cooled flange connection in accordance with claim 1, and further comprising a plurality of nuts connected to the plurality of bolts respectively and the plurality of nuts seal off the plurality of bolt holes from an environment of the gas-turbine engine.

5. The cooled flange connection in accordance with claim 3, and further comprising a plurality of nuts connected to the plurality of bolts respectively and the plurality of nuts seal off the plurality of bolt holes from the environment of the gas-turbine engine.

6. The cooled flange connection in accordance with claim 4, wherein the plurality of bolts and bolt holes pass through the first and second circumferential ducts.

7. The cooled flange connection in accordance with claim 1, wherein the plurality of bolts and bolt holes pass through the first and second circumferential ducts.

8. The cooled flange connection in accordance with claim 1, wherein all of the plurality of inflow recesses are arranged circumferentially offset relative to all of the plurality of outflow recesses.

9. The cooled flange connection in accordance with claim 1, wherein all of the respective inflow axes and all of the respective outflow axes are parallel to the main axial direction of the cooled flange connection.

\* \* \* \* \*